Patented Feb. 20, 1940

2,191,240

UNITED STATES PATENT OFFICE 2,191,240

MANUFACTURE OF STABILIZED GASOLINE

Donald R. Stevens, Swissvale, Pa., and Horace B. Cooke, Arlington, Va., assignors to Gulf Oil Corporation, Pittsburgh, Pa., a corporation of Pennsylvania No Drawing. Application December 5, 1936, Serial No. 114,492

2 Claims. (Cl. 44—9)

This invention relates to the manufacture of stabilized motor fuel, that is to say, gasoline or gasoline-like hydrocarbons of high anti-knock value and free or substantially free from gum-forming tendencies, from normally gaseous olefines, and to a process wherein such normally gaseous olefines are subjected to contact with an acid polymerizing catalyst at elevated temperature and pressure, in the presence of limited amounts of a phenol, whereby a major proportion of the olefinic constituents of the gases are polymerized to normally liquid hydrocarbons boiling within a gasoline boiling-point range and a minor portion of the olefinic constituents are caused to react with the phenol to produce a normally liquid anti-oxidant permanently soluble in the gasoline polymers and effective to inhibit or prevent oxidational changes which would otherwise result in formation of gums, discoloration and the like; all as more fully hereinafter set forth and as claimed.

In recent years a number of processes for effecting polymerization of normally gaseous olefines, such as butylenes and propylene, have been proposed. A number of these processes have relied upon the use of acid catalytic agents, such as sulfuric acid, phosphoric acid and the like; such agents, at suitable temperatures and pressures promote polymerization of normally gaseous olefines to normally liquid gasoline-like polymers useful as a motor fuel and having high anti-knock value when so used. However, the gasoline-like polymers recovered in catalytic polymerization processes of the character indicated may contain undesirable gum-forming constituents and other undesirable unsaturated constituents, which are subject to oxidational changes upon storage and exposure to light and to air, resulting in formation of gums and discoloration. It is sometimes difficult to refine such materials without incurring severe treating losses or without seriously reducing the anti-knock value thereof. Our invention therefore contemplates a process in which polymerization of normally gaseous olefines is effected in the presence of an acid catalyst, such as sulfuric acid, phosphoric acid or the like, or an ester thereof, the contact between the normally gaseous olefines and the catalyst taking place in the presence of a phenol, whereby a portion of the normally gaseous olefines present are caused to react with the phenols to form normally liquid bodies having anti-oxidant properties and permanently soluble in the resultant polymer gasoline, such anti-oxidant bodies being formed in sufficient amount to stabilize the polymer gasoline against deterioration through oxidational changes.

Where the polymer gasoline is to be blended with other gasoline of lower anti-knock value, sufficient anti-oxidant material may be provided to stabilize the ultimate blend (polymer gasoline plus gasoline otherwise produced) against such oxidational changes.

Our invention has for other objects such additional operative improvements and advantages as may hereinafter be found to obtain.

In carrying out the process of our invention, gases containing olefinic constituents, for example refinery gases produced in cracking hydrocarbon oils, natural gases which have been subjected to previous thermal treatment to increase the olefine content thereof, or gaseous olefines or mixtures thereof from any other source, are contacted with an acid polymerizing catalyst of the character indicated, at suitable polymerizing temperatures and pressures, in the presence of a phenol. The operation is preferably, although not necessarily, conducted in a continuous manner; in continuous operation a stream of hydrocarbon gases is passed over the catalyst and the effluent products are condensed or scrubbed to remove normally liquid products resulting from the treatment.

Where the polymerization catalyst is sulfuric acid, temperatures of 100° to 150° C. are suitable, whereas with phosphoric acids, somewhat higher temperatures, for example, from 150° to 300° C., are suitable. Elevated pressures of, for example, 100 pounds per square inch to 1000 pounds per square inch are employed.

The acid may be introduced as a liquid, but at the higher temperatures it is better to distribute the acid upon a solid adsorbent carrier, such as pumice. While the phenol may be introduced in the feed gases, or separately, it is preferred to introduce it in solution in the acid. Where the acid catalyst is distributed upon a solid carrier, the phenol may be supplied at that point, as for example in solution in a portion of the polymers previously made.

During the contact of the olefinic gases and the catalyst, polymerization of olefines is effected, and reactions are caused to take place between a portion of the olefinic gases present and the phenol introduced into the system, thereby resulting in the formation of phenol-olefine reaction products. These products possess strong anti-oxidant properties and are permanently soluble in the polymer gasoline but, for the most part at least, insoluble in water and dilute alkali solution, so that they will not be removed from the polymer gasoline upon subsequent washing with water or dilute alkali solution. It is ordinarily desirable to wash the polymer gasoline with dilute alkali solution, for example, with a solution containing from 10 to 15 per cent of caustic soda, after condensation, in order to remove any excess of the original phenol and any acidic materials carried over from contact with the catalyst.

A considerable portion of the anti-oxidant material thus formed boils within a gasoline boiling-point range, and will remain in the polymer gasoline even upon subsequent redistillation. Where the polymer gasoline is redistilled or fractionated down to a gasoline end boiling point, some high-boiling anti-oxidant material may remain in the residue from such distillation. Such anti-oxidant may be recovered and separately employed, or even returned to the polymer gasoline.

The anti-oxidants formed result from the alkylation of the phenol through reaction with various olefines present, such as propylene and butylenes. The alkylation linkages in these anti-oxidant compounds are preferably of the tertiary and secondary types, and some primary type alkylation linkages may be present in the total anti-oxidant formed. Alkylated phenols with secondary and tertiary alkylation linkages tend to be sufficiently insoluble in dilute alkali solutions, whereas alkylated phenols in which the alkylation linkages are of the primary or normal type tend to be more soluble in dilute alkali solution, unless the alkylation chains are quite long. The tertiary alkyl groups are more readily formed at ordinary temperatures and pressures and indeed it ordinarily requires elevated temperatures and pressures to form alkylated phenols with primary and secondary alkyl groups, under the conditions of our process. On the other hand, as the temperatures rise, the tertiary alkyl groups, are more easily split off, with resultant dealkylation of the compound, than are the secondary and primary types. At temperatures of operation up to about 135 or 150° C. conditions favor the formation of tertiary, or tertiary and secondary, alkylation linkages, and in polymerizing at temperatures up to 135° C., the phenol may be introduced at or prior to the contact of the olefinic gases with the catalyst without fear of de-alkylation, as, for example, in polymerizing with sulfuric acid.

Where the temperatures are higher, as, for example, in polymerizing olefinic gases with a phosphoric-acid type catalyst at temperatures of from 150° to 300° C., if the phenol is introduced ahead of or during contact of the olefinic gases with the main catalyst body, alkylation of the phenol will take place, but the alkylated products may predominate in the primary or normal and secondary types, and some of the primary type alkylated products formed may be soluble in water and in dilute caustic soda solution. This may involve subsequent loss of this portion of the total anti-oxidant upon subsequent washing of the polymer gasoline, or upon subsequent contact of the polymer gasoline with water at any time before its ultimate use as a fuel. Consequently, where the olefinic gases are thus contacted with the acid catalyst at temperatures above 150° C. we prefer to introduce the phenol at a point following the main polymerizing operation. Thus, the gases after contact with the main body of catalyst may be reduced in temperature to below 150° C. and the phenol added after such temperature reduction. Usually the products of polymerization, at this point, will contain sufficient quantities of entrained acid, or acid esters derived from the catalyst, to catalyze the alkylation, or the pressures may be high enough, at temperatures of say 100° to 135° or 150° C., to effect the alkylation in the presence of little or no catalyst; pressures of from 200 to 500 pounds per square inch, or higher, are preferred. Where that proves not to be the case, the products leaving the main polymerizing catalyst body may be reduced in temperature to below 150° C. and then contacted with a further body of catalyst, at a reduced temperature, preferably from 100° to 135° C., in the presence of a phenol. In this manner, the formation of alkylated phenols predominating in tertiary, or in tertiary and secondary, alkylation linkages may be insured.

The selection of the point at which the phenol is added will thus vary in accordance with the nature of the polymerization process and the temperatures and pressures involved, and to some extent upon the type of catalyst employed. It is recognized that of the alkylated phenols which may be formed in accordance with the various operations indicated, those having normal alkylation linkages are not necessarily less efficient as anti-oxidants than those having secondary and tertiary alkylation linkages, and in some instances, as for example, where the polymerized products are not to be washed with water or dilute alkali solution, the formation of such compounds may actually be preferred by reason of their anti-oxidant value and sometimes also by reason of their relatively low boiling points. Thus, certain alkylated phenols, in which the alkylation linkages are of the primary type, are excellent anti-oxidants, even though soluble in dilute alkali. Where the latter is not disadvantageous, high temperatures of operation, for example, from 150° to 350° C., may be employed.

In most cases, however, the polymerized products obtained by polymerizing olefinic gases in the presence of an acid type catalyst will require washing with dilute alkali solution, prior to their ultimate use as fuel, and where this is true the operation should be so conducted at temperatures below active de-alkylation temperatures, to produce those types of alkylated phenols which are insoluble in the washing agent; the alkylated phenols having alkylation linkages of the tertiary and secondary types are preferred. As has been indicated, the extent and manner of alkylation are to a considerable extent a function of the temperature of operation; while the range of from 135° to 150° C., has been mentioned as a proper line of division for general purposes, it will be understood that the precise temperature conditions favoring tertiary linkages on the one hand, and normal linkages on the other hand, will vary somewhat for different phenols and different reactants; in individual instances, if dealkylation of tertiary compounds is to be avoided, a somewhat different line of division may apply, as may be readily determined by the solubility characteristics of the anti-oxidants formed.

The amount of phenol employed in all cases will be so limited as to react with only a minor portion of the olefinic gases present, so that the final product of the process comprises a mixture of a major quantity of polymer gasoline and a minor quantity, for example, between 0.5 and 20 per cent by volume, of the anti-oxidant. In one type of operation the amount of phenol is so adjusted as to produce merely sufficient antioxidant to effect stabilization of the polymer gasoline. In another type of operation, where the polymer gasoline is to be blended with gasoline otherwise produced and susceptible to oxidational changes upon standing and exposure to light and air, the operation is so conducted as to produce sufficient anti-oxidant in solution in the polymer gasoline to effect stabilization of the ultimate blend of polymer gasoline and gasoline blending stock. The latter may be a straight-run gasoline, a cracked gasoline, or a mixture of cracked and straight-run gasolines.

As phenolic reaction material, we may employ phenol itself, or the higher homologs thereof, such as the various cresols and xylenols. It is not necessary to employ these constituents in pure form. For example, commercial "90 per cent phenol" and "crude cresylic acid" may be employed. The phenol may be of the monohydric type or of the polyhydric type, although the monohydric phenols are preferred by reason of their cheapness and availability.

Ordinarily it is simply necessary, after condensing the polymerized products to subject them to dilute alkali and water washes. But, as has been indicated hereinabove, they may be redistilled down to the desired gasoline end point where the condensate would otherwise contain high-boiling constituents in undesirable amount; such re-distillation should not be of such character as to remove all of the antioxidant material.

It is recognized that in the manufacturing antioxidants of the character referred to hereinabove, in the presence of sulfuric acid or the like, some polymerization is usually incidental to the operation. Our invention is however to be distinguished from processes in which polymerization is incidental, resulting in the formation of a minor amount of gasoline polymers and a major amount of anti-oxidant; according to our invention, the formation of anti-oxidant is incidental to the polymerization of the normally gaseous materials, the operation in all cases being so conducted as to produce a normally liquid produce comprising a major amount of gasoline polymers and a minor amount of anti-oxidants.

Various modifications and details of operation will doubtless suggest themselves to those skilled in the art. While we have described and illustrated our invention hereinabove with reference to various specific operation details, my invention in its broadest aspects is not limited to such details and may be variously practiced and embodied within the scope of the claims hereinafter made.

What we claim is:

1. The process of obtaining a gasoline fuel having a high anti-knock value and stabilized against oxidational changes resulting in formation of gums, color deterioration and the like, from normally gaseous olefines, which comprises passing such gases over an acid polymerizing catalyst at an elevated temperature above 150° C., to effect polymerization thereof to normally liquid products within a motor-fuel boiling-point range, then reducing the temperature of the product to a temperature below 150° C., and reacting the products at such reduced temperature with a phenol to form alkylated phenols having anti-oxidant properties, and subsequently recovering the resultant mixture of polymers and anti-oxidant as a unitary end product.

2. The process of obtaining a gasoline fuel having a high anti-knock value and stabilized against oxidational changes resulting in formation of gums, color deterioration and the like, from normally gaseous olefines, which comprises passing such gases over a phosphoric-acid type catalyst, at a temperature of from 150° C. to 350° C., and under superatmospheric temperature, to effect polymerization of said olefines to normally liquid gasoline-like polymers, then reducing the temperature of the products leaving the catalyst zone to a temperature below 150° C., and reacting them with a phenol to form alkylated phenols insoluble in dilute alkali solution, and having anti-oxidant properties, recovering the liquid products of polymerization and alkylation thereby obtained, and washing them with dilute alkali solution to remove undesirable acidic bodies therefrom.

DONALD R. STEVENS.
HORACE B. COOKE.